(12) United States Patent
Yang et al.

(10) Patent No.: US 9,503,627 B2
(45) Date of Patent: Nov. 22, 2016

(54) HANDLE FOR HANDHELD TERMINAL

(71) Applicants: Jinrong Yang, Shanghai (CN); Ramzi Khalil Maalouf, Chevy Chase, MD (US)

(72) Inventors: Jinrong Yang, Shanghai (CN); Ramzi Khalil Maalouf, Chevy Chase, MD (US)

( * ) Notice: Subject to any disclaimer, the term of this patent is extended or adjusted under 35 U.S.C. 154(b) by 0 days.

(21) Appl. No.: 14/705,522

(22) Filed: May 6, 2015

(65) Prior Publication Data

US 2015/0237251 A1 Aug. 20, 2015

Related U.S. Application Data

(63) Continuation of application No. 13/961,670, filed on Aug. 7, 2013, now Pat. No. 9,055,144.

(30) Foreign Application Priority Data

Nov. 28, 2012 (CN) .......................... 2012 2 0638696

(51) Int. Cl.
*H04M 1/725* (2006.01)
*H04N 5/232* (2006.01)

(52) U.S. Cl.
CPC ....... *H04N 5/23203* (2013.01); *H04M 1/7253* (2013.01); *H04N 5/23241* (2013.01)

(58) Field of Classification Search
CPC ........... H04N 5/23203; H04N 5/23241; H04M 1/7253
USPC ................ 455/556.1, 557, 90.1–90.3, 550.1, 455/575.1, 575.3, 575.4
See application file for complete search history.

(56) References Cited

U.S. PATENT DOCUMENTS

| | | |
|---|---|---|
| 5,872,565 A | 2/1999 | Greaves et al. |
| 6,417,797 B1 | 7/2002 | Cousins et al. |
| 6,965,400 B1 | 11/2005 | Haba et al. |
| 6,976,111 B1 | 12/2005 | Mills et al. |
| 7,404,001 B2 | 7/2008 | Campbell et al. |
| 7,412,259 B2 | 8/2008 | Yoo et al. |
| 8,244,299 B1 | 8/2012 | Bishop |
| 8,385,974 B1 | 2/2013 | Bishop |
| 8,577,412 B1 | 11/2013 | Bishop |
| 8,832,287 B2 | 9/2014 | Yang et al. |
| 8,842,155 B2 | 9/2014 | Border et al. |
| 8,915,660 B1 | 12/2014 | Ben Yehuda et al. |
| 2002/0024506 A1 | 2/2002 | Flack et al. |
| 2002/0044225 A1 | 4/2002 | Rahib |
| 2002/0183102 A1 | 12/2002 | Withers et al. |
| 2009/0185040 A1 | 7/2009 | Yang et al. |
| 2012/0081500 A1 | 4/2012 | Border et al. |
| 2013/0005401 A1 | 1/2013 | Rosenhan et al. |

(Continued)

OTHER PUBLICATIONS

U.S. Appl. No. 13/961,670, filed Aug. 7, 2013, Jinrong Yang, et al.
Zacuto, "iPhone 3gs Accessories Video", Jul. 13, 2009, pp. 1-8.

*Primary Examiner* — Sam Bhattacharya
(74) *Attorney, Agent, or Firm* — Michael Best & Friedrich LLP

(57) ABSTRACT

A handle for a handheld terminal includes a first interface module, a first key module, a first power supply module, and a base handle module. The handle couples with the handheld terminal. The handle makes a wireless connection with the handheld terminal the first interface module or a wired connection with the handheld terminal via the first interface module. The first key module includes one or more user operation command keys. The first power supply module supplies power for the handle. The handle is operable with one hand.

38 Claims, 2 Drawing Sheets

(56) References Cited

U.S. PATENT DOCUMENTS

2013/0233986 A1 9/2013 Rasheta
2014/0093229 A1 4/2014 Lecuna Aguerrevere
2014/0146193 A1 5/2014 Yang et al.

HANDLE FOR HANDHELD TERMINAL

This application is a continuation of U.S. patent application Ser. No. 13/961,670, filed Aug. 7, 2013, entitled "Handle for Handheld Terminal", which is hereby incorporated by reference in its entirety.

This application also claims priority to WO/2014/082378, filed Nov. 28, 2013, entitled "One-Hand Manipulation Handle for Hand-Held Terminal", which is hereby incorporated by reference in its entirety.

This application also claims priority to Chinese Application No. 201220638696.7, filed Nov. 28, 2012, entitled "One-Hand Manipulation Handle for Hand-Held Terminal", which is hereby incorporated by reference in its entirety.

BACKGROUND

1. Field

The present disclosure relates to a handle, in particular to a handle for mobile phone or other handheld terminals that can be used in taking photographs and creating videos.

2. Description of the Related Art

Handheld terminals, such as mobile phones, are becoming ever more widely used. With the advances in science and technology, the quality of camera technology in handheld terminals taking photos and creating video has improved.

As mobile phone photos or videos have become easier and convenient for timely viewing, transfer and sharing, users of handheld terminals are inspired to take more photos or videos with their handheld terminals. For many people, the frequency of mobile phone shooting has exceeded that of photos taken using a conventional camera. However, a typical mobile phone camera may have features that are not optimized for photography. For example, many handheld terminals are characterized by inconvenient operation, such as poor gripping, and by poor shooting effects. Also, with some handheld terminals, it may be difficult to take photos or videos with one hand.

SUMMARY

Systems and methods are described herein for holding and operating handheld terminal devices, such as mobile phones. According to one embodiment, a handle for a handheld terminal includes a first interface module, a first key module, a first power supply module, and a base handle module. The handle couples with the handheld terminal. The handle makes a wireless connection with the handheld terminal the first interface module or a wired connection with the handheld terminal via the first interface module. The first key module includes one or more user operation command keys. The first power supply module supplies power for the handle. The handle is operable with one hand. In some embodiments, the handheld terminal is held in a chuck that adjusts to couple to the housing of the handheld terminal. In certain embodiments, the handle allows a user to operate a camera of a mobile phone remotely.

According to one embodiment, a method of using a handheld terminal includes coupling a handle to a handheld terminal comprising a camera, and operating one or more keys on the handle to control one or more operations on the camera.

Figure 1:
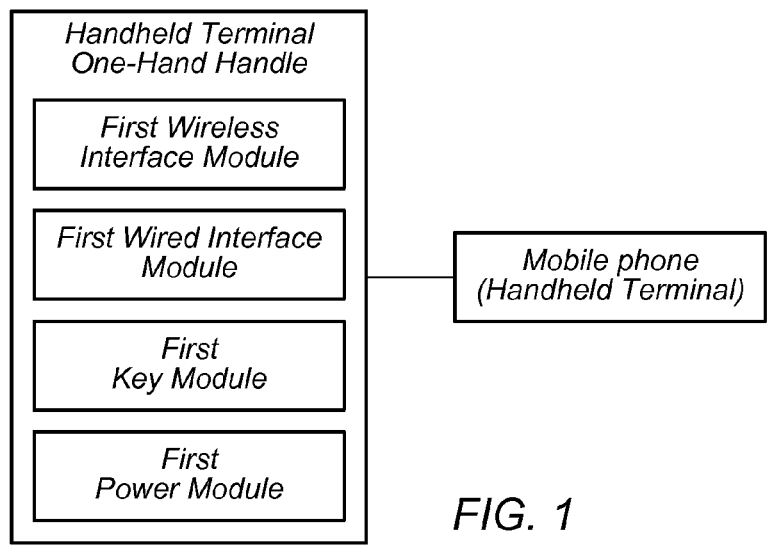
FIG. 1 is the modular structure diagram of a one-hand handle according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In some embodiments, a handheld terminal one-hand handle fixes (for example, secures or holds) a mobile phone or other handheld terminal via the handle, operates the mobile phone or handheld terminal shooting function via buttons on the handle. In certain embodiments, remote control operations can also be performed (for example, a non-fixed mode). Illustrative embodiments of a handle are described as below.

In some embodiments, a one-hand handle module include a first wireless interface module and/or the first wired interface module, a first key module, and a first power module. The one-hand handle has a wireless connection with the handheld terminal via the first wireless interface module or has a wired connection via the first wired interface module. The first key module is provided with a user operation command key. The first power supply module supplies work power for the one-hand handle.

A handle base module includes a transformable chuck, handle pillar, and handle tripod. The handle pillar includes a slot sliding plate, buttons, magnets and springs. The buttons and magnets are used to control the slot sliding plate.

When the slot sliding plate is pulled out to the appropriate length and placed in the handheld terminal device, the spring may lock the handheld terminal, fixes via the buttons and the magnets. The sliding of the slot is used to fix the handheld terminal after opening along with the chuck.

In some embodiments, a user operation command keys include one or more of a camera key, video key and zoom key, camera/video shift key and zoom key. The first wireless interface module may be WIFI or Bluetooth. The first interface module may be, in various embodiments, a USB interface or an iPhone interface connected with the handheld terminal.

The first key module may be available for users to input command. The first power supply module may include lithium-ion batteries, nickel-cadmium batteries, button batteries or dry batteries, which can be charged and discharged.

The gripping position of the one-hand handle may be equipped with anti-slip material or coating. The USB interface or iPhone interface may be positioned at the handheld terminal behind the handheld base module and the contact surface of the one-hand handle, or the USB interface or iPhone interface is at the side surface of handheld terminal, and can connect with the handheld terminal via the lead. The handheld terminal is mobile phone.

The one-hand handle may include a remote control of the mobile phone. The one-hand handle may have the following advantages (in a mobile phone for example): the handle may realizes the transformation from the behavior pattern of operating the mobile phone for taking pictures or videos to the behavior pattern of one-hand operating mobile phone, controlling the camera or video function of the handheld terminal, so that the handheld terminal is convenient and comfortable holding. The one hand handle may also provide stability and security.

Illustrative Embodiment

As shown in FIG. 1, it is a modular structure diagram of the one-hand handle of the utility model handheld terminal in the preferred embodiment, the one-handed handle is equipped with handle module and handle base module. The handle comprises of the first wireless interface module and/or the first wired interface module as well as the first key module and the first power module; the handle base comprises of chuck module, handle pillar module and handle foot stand module. The one-hand handle has connection with the handheld terminal via the first wireless interface module, or has wired connection via the first wired interface module.

Figure 2:
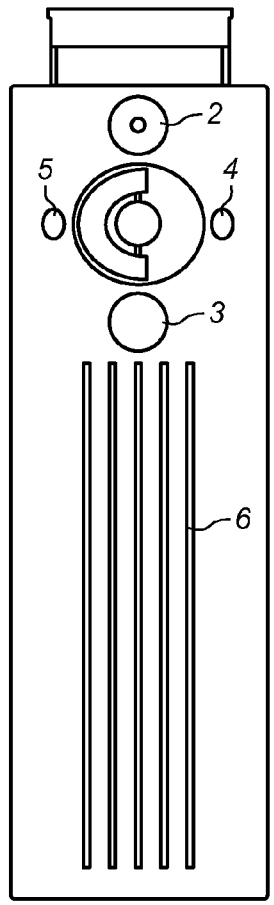
FIG. 2 is the front view illustrating a one-hand handle in one embodiment.
Figure 3:
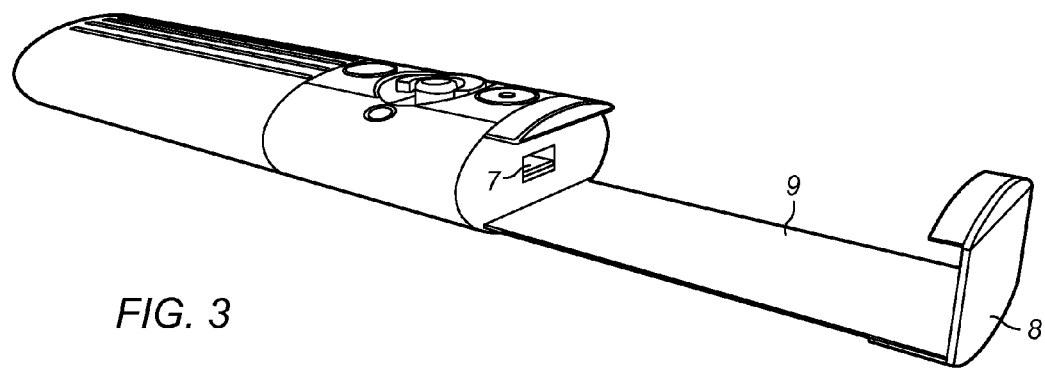
FIG. 3 illustrates the one-hand handle's slot sliding plate pulling state diagram in one embodiment.

As shown in FIG. 2 and FIG. 3, the handle base module comprises of transformable chuck 8, slot sliding plate 9, magnet and spring, the button 1, the magnet, spring, button are used to control the openness and closing of slot sliding plate 9 and the real-time position of the slot sliding plate 9. The slot sliding plate 9 fixes the handheld terminal along with the transformable chuck 8.

The first key module equips with the user operation command key. The first power supply module supplies work power for the one-handed handle. The gripping position of the one-hand handle is also equipped with anti-slip material or member. This embodiment may include slots, such as slot 6.

The first key module may be available for users to input commands. The user operation command keys may include a camera key, video key and zoom key, or camera/video shift key and zoom key, or combinations thereof. FIG. 2 shows an example arrangement of keys, including the camera key 2, camera/video shift key, first zoom key 4, and second zoom button 5. The first zoom key 4 and the second zoom key 5 may correspond to the objects with different focal lengths.

A wireless interface module may be, in various embodiments, WIFI or Bluetooth. An interface module may include a USB interface or I Phone interface connected with the handheld terminal.

In some embodiments, the first power supply module is lithium-ion batteries, nickel-cadmium batteries, button batteries or dry batteries, which can be charged and discharged.

As shown in FIG. 3, an interface (for example, USB or iPhone) is positioned at the handheld terminal behind the handheld base module and the contact surface of the one-hand handle. In one embodiment, interface 7 may be the interface connecting with an iPhone. In another embodiment, the USB interface or iPhone interface may be at the side surface of handheld terminal and can connect with the handheld terminal via the lead.

Figure 4:
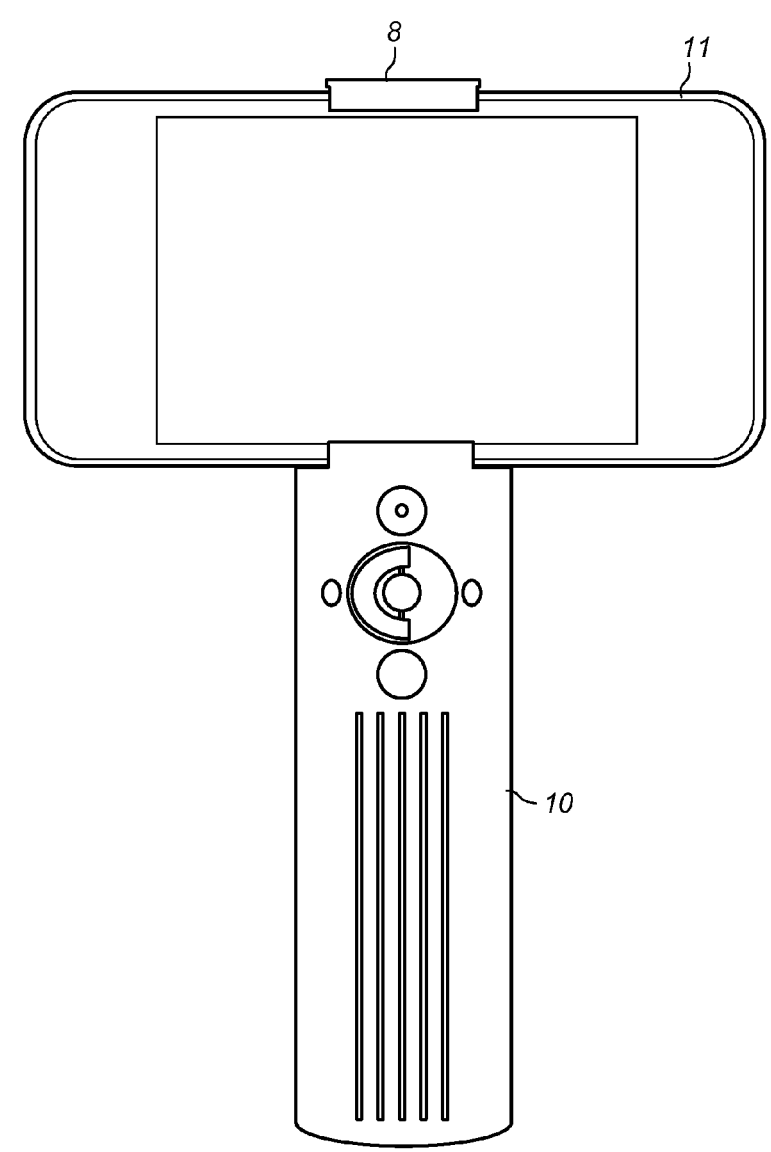
FIG. 4 illustrates a fixed mobile phone one-hand handle's usage state diagram in one embodiment.

In some embodiments, the handheld terminal being held by a handle is a mobile phone. FIG. 4 illustrates a mobile phone held in a chuck of a handle. One or more magnets, springs, and buttons of handle 10 may be used to control the opening and closing of slot sliding plate 9, and holding of handheld 11 in the chuck. The real-time position of the slot sliding plate 9, the slot sliding plate 9 fixes the handheld terminal along with the transformable chuck 8. After being positioned, the slot sliding plate 9 will not move up and down, thus one-hand operating the mobile phone command will become much easier.

In some embodiments, a one-hand handle can also be used as the remote control of the mobile phone.

The various methods as illustrated in the figures and described herein represent exemplary embodiments of systems and methods. The systems and methods may be implemented manually, in software, in hardware, or a combination thereof. The order of any method may be changed, and various elements may be added, reordered, combined, omitted, modified, etc. Additionally, various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A handheld device to hold and wirelessly operate a camera of a mobile phone, wherein the handheld device comprises:
    a spring-loaded holder configured to hold the mobile phone; and
    a handle apparatus coupled to the spring-loaded holder, wherein the handle apparatus comprises:
        a power supply module comprising one or more batteries;
        a button that is selectable and corresponds to a camera feature of the mobile phone,
            wherein the button is positioned on the handle apparatus such that a user is able to, with one hand, both hold the handle apparatus and select the button while the spring-loaded holder holds the mobile phone, and
        a moveable end of the spring-loaded holder holds the mobile phone in place using one or more springs;
        a wireless interface module configured to provide a wireless connection to the mobile phone,
            wherein the wireless connection provides remote control of the camera feature of the mobile phone; and
        a command key module configured to receive an indication of a selection of the button,
            wherein, in response to the button being selected, the wireless interface module provides a remote control command to the mobile phone via the wireless connection such that the remote control command indicates to the mobile phone to perform the camera feature.

2. The handheld device of claim 1, wherein the spring-loaded holder comprises a sliding member configured to allow one end of the spring-loaded holder to both move to hold the mobile phone and move to release the mobile phone, and wherein the sliding member uses one or more springs to slide the moveable end of the spring-loaded holder into a position such that the moveable end, using a force from the spring, holds the mobile phone in place.

3. The handheld device of claim 1, wherein the handle apparatus comprises a Universal Serial Bus interface positioned at one end of the handle apparatus.

4. The handheld device of claim 1, wherein the handle comprises a pattern of physical, anti-slip features within a gripping position of a user's hand on the handle apparatus.

5. The handheld device of claim 1, wherein the button is one of a plurality of buttons positioned on the handle apparatus, and wherein each of the plurality of buttons corresponds to a respective command.

6. The handheld device of claim 5, wherein the wireless connection is a Bluetooth connection.

7. The handheld device of claim 1, wherein the camera feature corresponds to a video feature.

8. The handheld device of claim 1, wherein the handle apparatus is configured to be held by a user of the mobile phone, and wherein the handle apparatus is configured to provide an alternative to the mobile phone being held directly by the user.

9. The handheld device of claim 1, wherein the spring-loaded holder is configured to adjust, using the sliding member, to hold mobile phones of various sizes.

10. The handheld device of claim 1, wherein the handheld device, when the spring-loaded holder holds the mobile phone, provides a stable and secure hold and control of the mobile phone.

11. The handheld device of claim 1, wherein when the spring-loaded holder holds the mobile phone, the handheld device transforms the mobile phone from a device configured for direct two-handed holding and operation to a device usable for indirect, one-handed holding and operation via the handheld device.

12. The handheld device of claim 1, wherein the handheld device provides remote control of the mobile phone irrespective of whether the spring-loaded holder is physically coupled to the mobile phone.

13. A handheld device to wirelessly operate a camera of a mobile device, wherein the handheld device comprises:
a holder configured to hold the mobile device, wherein the holder comprises a sliding apparatus, and
the sliding member uses one or more springs to slide the moveable end of the spring-loaded holder to allow insertion of the mobile phone, and wherein, after allowing insertion of the mobile phone into the spring-loaded holder, and in response to release of the moveable end, the sliding member, using the one or more springs, provides a compressive force on the mobile phone to hold the mobile phone in place; and
a handle apparatus coupled to the holder, wherein the handle apparatus comprises:
a power supply module comprising one or more batteries;
a command key that is selectable and corresponds to a camera feature of the mobile device, wherein the command key is positioned on the handle apparatus such that a user is able to, with one hand, both hold the handle apparatus and select the command key;
a wireless interface module configured to provide a wireless connection to the mobile device, wherein remote control of the camera feature of the mobile device is provided over the wireless connection; and
a command key module configured to provide, via the wireless connection, a control command to the mobile device such that the control command indicates to the mobile device to perform the camera feature.

14. The handheld device of claim 13, wherein the moveable end of the holder holds the mobile phone in place using one or more springs.

15. The handheld device of claim 13, wherein the handle apparatus comprises a Universal Serial Bus interface positioned at one end of the handle.

16. The handheld device of claim 13, wherein the handle apparatus comprises a pattern of physical, anti-slip features within a gripping position of a user's hand on the handle apparatus.

17. The handheld device of claim 13, wherein the command key is one of a plurality of command keys positioned on the handle apparatus.

18. A handheld device to hold and wirelessly operate a camera of a mobile phone, wherein the handheld device comprises:
a holder that, during use, holds a mobile phone; and
a handle apparatus coupled to the holder, wherein the handle apparatus comprises:
a selectable button that corresponds to a camera feature of the mobile phone,
wherein the button is positioned on the handle apparatus such that a user, during use, is able to use one hand to both hold the handle apparatus and select the selectable button;
a wireless interface module that, during use, provides a wireless connection to the mobile phone,
wherein the wireless connection provides remote control of the camera feature of the mobile phone;
a Universal Serial Bus interface positioned at one end of the handle apparatus, and
a command key module that during use and in response to the selectable button being selected, sends, via the wireless connection, a remote control command to the mobile phone indicating to the mobile phone to perform the camera feature.

19. The handheld device of claim 18, wherein the spring-loaded holder, using a sliding member, allows one end of the spring-loaded holder to both move to hold the mobile phone and move to release the mobile phone, and wherein the sliding member, during use, uses one or more springs to slide the moveable end of the spring-loaded holder into a position such that the moveable end, using a force from the spring, holds the mobile phone in place.

20. The handheld device of claim 18, wherein the moveable end of the spring-loaded holder holds the mobile phone in place using one or more springs.

21. The handheld device of claim 18, wherein the handle comprises a pattern of physical, anti-slip features within a gripping position of a user's hand on the handle apparatus.

22. The handheld device of claim 18, wherein the button is one of a plurality of buttons positioned on the handle apparatus, and wherein each of the plurality of buttons corresponds to a respective command.

23. The handheld device of claim 18, wherein the wireless connection is a Bluetooth connection.

24. The handheld device of claim 18, wherein the camera feature corresponds to a video feature.

25. The handheld device of claim 18, wherein the handle apparatus, during use, provides an alternative to the mobile phone being held directly by the user.

26. The handheld device of claim 18, wherein the spring-loaded holder, during use and using the sliding member, adjusts to hold mobile phones of various sizes.

27. The handheld device of claim 18, wherein when the spring-loaded holder holds the mobile phone, the handheld device transforms the mobile phone from a device configured for direct two-handed holding and operation to a device usable for indirect, one-handed holding and operation via the handheld device.

28. The handheld device of claim 18, wherein the handheld device provides remote control of the mobile phone irrespective of whether the spring-loaded holder is physically coupled to the mobile phone.

29. A handheld device to wirelessly operate a camera of a mobile device, wherein the handheld device comprises:
   a holder that, during use, holds the mobile device; and
   a handle apparatus coupled to the holder, wherein the handle apparatus comprises:
      a command key that, during use, is selectable and corresponds to a camera feature of the mobile device, wherein the command key is positioned on the handle apparatus such that a user is able to, with one hand, both hold the handle apparatus and select the command key;
      a wireless interface module that, during use, provides a wireless connection to the mobile device,
         wherein remote control of the camera feature of the mobile device is provided over the wireless connection; and
      a command key module that, during use, provides, via the wireless connection, a control command to the mobile device such that the control command indicates to the mobile device to perform the camera feature, wherein the command key is one of a plurality of command keys positioned on the handle apparatus, and wherein each of the plurality of command keys corresponds to a respective command.

30. The handheld device of claim 29, wherein the holder, using a sliding member, allows one end of the holder to both move to hold the mobile phone and move to release the mobile phone, and wherein the sliding member, during use, uses one or more springs to slide the moveable end of the holder into a position such that the moveable end, using a force from the spring, holds the mobile phone in place.

31. The handheld device of claim 29, wherein the moveable end of the holder holds the mobile phone in place using one or more springs.

32. The handheld device of claim 29, wherein the handle apparatus comprises a Universal Serial Bus interface positioned at one end of the handle apparatus.

33. The handheld device of claim 29, wherein the handle comprises a pattern of physical, anti-slip features within a gripping position of a user's hand on the handle apparatus.

34. The handheld device of claim 29, wherein the wireless connection is a Bluetooth connection.

35. The handheld device of claim 29, wherein the camera feature corresponds to a video feature.

36. The handheld device of claim 29, wherein the handle apparatus, during use, provides an alternative to the mobile phone being held directly by the user.

37. The handheld device of claim 29, wherein the holder, during use and using the sliding member, adjusts to hold mobile phones of various sizes.

38. The handheld device of claim 29, wherein when the holder holds the mobile phone, the handheld device transforms the mobile phone from a device configured for direct two-handed holding and operation to a device usable for indirect, one-handed holding and operation via the handheld device.

* * * * *

(12) INTER PARTES REVIEW CERTIFICATE (3230th)
United States Patent (10) Number: US 9,503,627 K1
Yang et al. (45) Certificate Issued: Sep. 13, 2023

(54) HANDLE FOR HANDHELD TERMINAL

(71) Applicants: Jinrong Yang; Ramzi Khalil Maalouf

(72) Inventors: Jinrong Yang; Ramzi Khalil Maalouf

(73) Assignee: Ramzi Khalil Maalouf

Trial Number:

IPR2020-00483 filed Feb. 3, 2020

Inter Partes Review Certificate for:

Patent No.: 9,503,627
Issued: Nov. 22, 2016
Appl. No.: 14/705,522
Filed: May 6, 2015

The results of IPR2020-00483 are reflected in this inter partes review certificate under 35 U.S.C. 318(b).

INTER PARTES REVIEW CERTIFICATE
U.S. Patent 9,503,627 K1
Trial No. IPR2020-00483
Certificate Issued Sep. 13, 2023

AS A RESULT OF THE INTER PARTES REVIEW PROCEEDING, IT HAS BEEN DETERMINED THAT:

Claims 29 and 37 are cancelled.

\* \* \* \* \*